(12) United States Patent
Perkins

(10) Patent No.: US 7,429,061 B2
(45) Date of Patent: Sep. 30, 2008

(54) DRIVE MECHANISM AND METHOD OF OPERATING THE SAME

(75) Inventor: John T. Perkins, Pittstown, NJ (US)

(73) Assignee: Ingersoll-Rand Company, Montvale, NJ (US)

( * ) Notice: Subject to any disclaimer, the term of this patent is extended or adjusted under 35 U.S.C. 154(b) by 387 days.

(21) Appl. No.: 11/400,155

(22) Filed: Apr. 6, 2006

(65) Prior Publication Data

US 2007/0182148 A1   Aug. 9, 2007

Related U.S. Application Data

(60) Provisional application No. 60/771,670, filed on Feb. 9, 2006.

(51) Int. Cl.
*B60S 9/02* (2006.01)

(52) U.S. Cl. .................. 280/766.1; 280/763.1

(58) Field of Classification Search ............. 280/763.1, 280/766.1, 765.1
See application file for complete search history.

(56) References Cited

U.S. PATENT DOCUMENTS

| | | |
|---|---|---|
| 1,976,985 A | 10/1934 | Davis |
| 2,056,525 A | 10/1936 | Johnson, Jr. et al. |
| 2,150,701 A | 3/1939 | Reid |
| 2,619,319 A | 11/1952 | Lucas |
| 2,926,889 A | 3/1960 | Obes |
| 2,959,395 A | 11/1960 | Strack et al. |
| 2,998,267 A | 8/1961 | Zajac et al. |
| 3,064,943 A | 11/1962 | Shrum |
| 3,077,120 A | 2/1963 | Viehweger, Jr. |
| 3,117,766 A | 1/1964 | Ketel |
| 3,166,298 A | 1/1965 | Stefano |
| 3,169,012 A | 2/1965 | Fagan |
| 3,321,182 A | 5/1967 | Elenburg |
| 3,341,179 A | 9/1967 | Smith |
| 3,503,588 A | 3/1970 | Bach |
| 3,526,414 A | 9/1970 | Palen |
| 3,628,811 A | 12/1971 | Rivers |
| 3,861,648 A | 1/1975 | Glassmeyer |
| 3,874,696 A | 4/1975 | Gardner et al. |
| 4,097,840 A | 6/1978 | Chappelle |
| 4,116,315 A | 9/1978 | Vandenberg |
| 4,187,733 A | 2/1980 | Walther et al. |
| 4,281,852 A | 8/1981 | Konkle |
| 4,345,779 A | 8/1982 | Busby |

(Continued)

FOREIGN PATENT DOCUMENTS

CA          706 288         3/1965

(Continued)

*Primary Examiner*—Christopher Ellis
*Assistant Examiner*—Bridget Avery
(74) *Attorney, Agent, or Firm*—Michael Best & Friedrich LLP

(57) ABSTRACT

A drive mechanism for a trailer support system secured to a trailer, the drive mechanism being operable to move the trailer support system relative to the trailer and including a gear box secured to the trailer support system, a motor supported adjacent to the gear box and having a drive shaft defining an axis, and a coupler positioned between the gear box and the motor shaft and facilitating movement a drive shaft relative to the gear box along the axis and in a direction substantially normal to the axis.

4 Claims, 10 Drawing Sheets

U.S. PATENT DOCUMENTS

| | | |
|---|---|---|
| 4,400,986 A | 8/1983 | Swanson et al. |
| 4,402,526 A | 9/1983 | Huetsch |
| 4,466,637 A | 8/1984 | Nelson |
| 4,923,175 A | 5/1990 | Bentrup |
| 4,943,079 A | 7/1990 | Harbold |
| 4,993,688 A | 2/1991 | Mueller et al. |
| 5,004,267 A | 4/1991 | Busby |
| 5,050,845 A | 9/1991 | Aline et al. |
| 5,100,105 A | 3/1992 | Schneider et al. |
| 5,224,688 A | 7/1993 | Torres et al. |
| 5,299,829 A | 4/1994 | Rivers, Jr. et al. |
| 5,911,437 A * | 6/1999 | Lawrence ............... 280/766.1 |
| 6,598,886 B2 | 7/2003 | Baird et al. |
| 6,926,305 B2 | 8/2005 | Daniel |
| 7,163,207 B2 * | 1/2007 | Baird et al. ............... 280/6.153 |

FOREIGN PATENT DOCUMENTS

| | | |
|---|---|---|
| DE | 209 042 | 4/1984 |
| EP | 0 177 482 | 4/1986 |
| GB | 2 091 657 | 8/1982 |
| JP | 03-031044 | 2/1991 |

\* cited by examiner

DRIVE MECHANISM AND METHOD OF OPERATING THE SAME

RELATED APPLICATIONS

This application claims priority to U.S. patent application Ser. No. 60/771,670 filed Feb. 9, 2006, the entire contents of which are incorporated herein.

FIELD OF THE INVENTION

The present invention relates to drive mechanisms, and more particularly, to a drive mechanism for moving a trailer support arrangement with respect to a trailer.

SUMMARY

In one embodiment, the invention provides a drive mechanism for a trailer support system secured to a trailer, the drive mechanism being operable to move the trailer support system relative to the trailer and including a gear box secured to the trailer support system, a motor supported adjacent to the gear box and having a drive shaft defining an axis, and a coupler positioned between the gear box and the motor shaft and facilitating movement a drive shaft relative to the gear box along the axis and in a direction substantially normal to the axis.

The invention also provides a drive mechanism for a trailer support system secured to a trailer, the drive mechanism being operable to move the trailer support system relative to the trailer and including a gear box secured to the trailer support system, a motor supported adjacent to the gear box, and a ball-and-socket coupler positioned between the gear box and the motor and drivingly connecting the motor and the gear box.

In another embodiment, the invention provides a drive mechanism for a trailer support system secured to a trailer, the trailer including an air brake, the drive mechanism being operable to move the trailer support relative to the trailer and including an air motor, an air line for providing air from the air brakes to the air motor, and a valve fluidly connecting the air brake and the air line and having a first condition, in which air is supplied to the air brake, and a second condition, in which air is supplied to the air motor and air is prevented from flowing to the air brakes.

Other aspects of the invention will become apparent by consideration of the detailed description and accompanying drawings.

DETAILED DESCRIPTION

Figure 1:
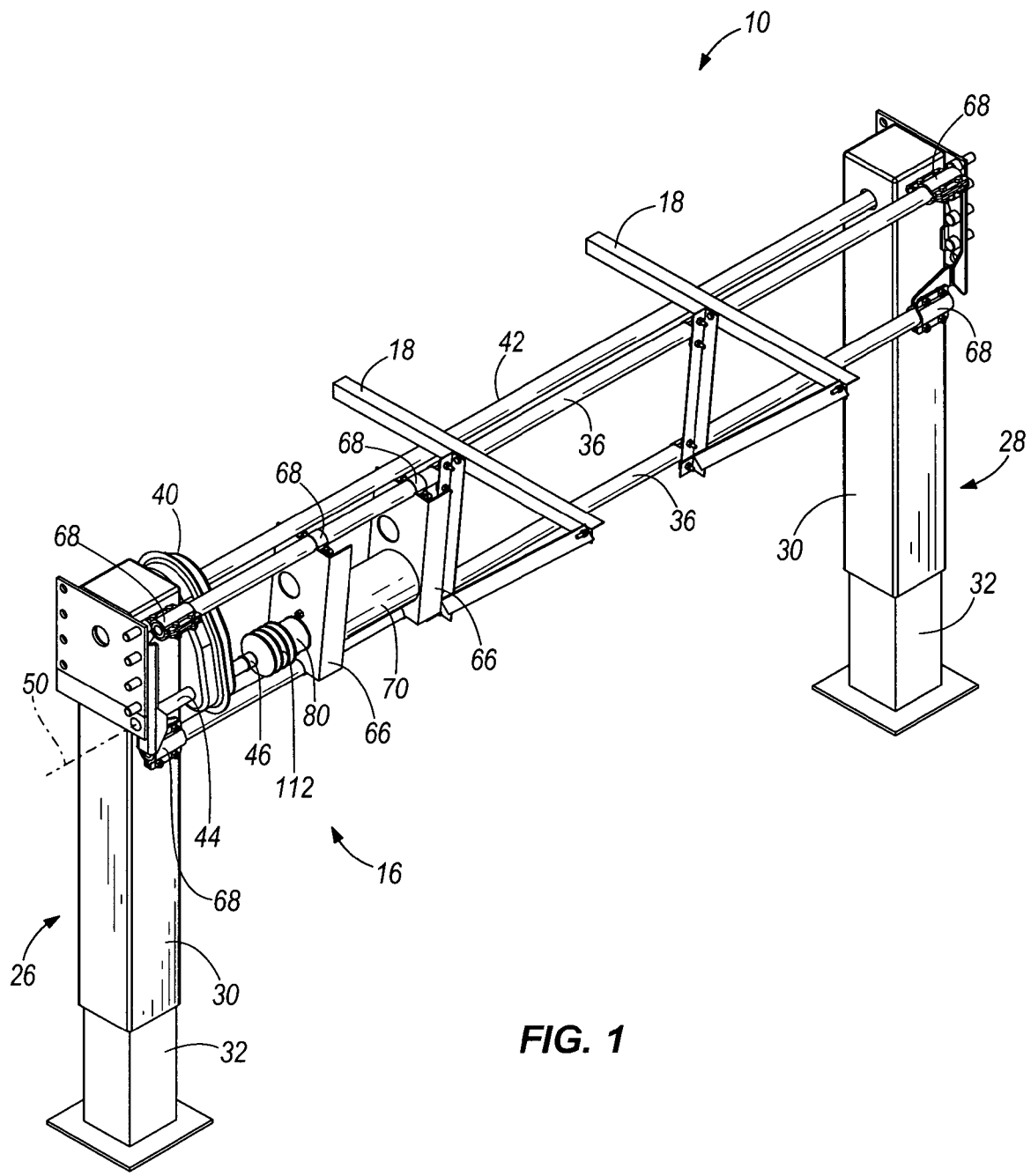
FIG. 1 is a perspective view of a trailer support arrangement and a drive mechanism for moving the trailer support arrangement according to some embodiments of the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," and "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In addition, it is to be understood that phraseology and terminology used herein with reference to device or element orientation (such as, for example, terms like "front," "side," "rear," "top," "bottom," "lower," "up," "down," etc.) are only used to simplify description of the present invention, and do not alone indicate or imply that the device or element referred to must have a particular orientation. The elements of the present invention can be installed and operated in any orientation desired. In addition, terms such as "first," "second," and "third" are used herein for purposes of description and are not intended to indicate or imply relative importance or significance.

FIGS. 1-8 illustrate a trailer support arrangement 10 for supporting a trailer or a portion of a trailer 14, and a drive mechanism 16 for moving the trailer support arrangement 10 with respect to the trailer 14. The trailer 14 includes a frame 18, wheels (not shown) connected to a rear end of the frame 18, and walls 20 enclosing a load space. The trailer support arrangement 10 is secured to the frame 18 adjacent a forward end of the frame 18 for supporting the forward end of the trailer 14 when the trailer 14 is parked, is being loaded, is not supported on a truck, and/or is being connected to or removed from a truck.

The trailer support arrangement 10 includes a first leg 26 secured to one side of the trailer 14 and a second leg 28 secured to the opposite side of the trailer 14. Each of the first and second legs 26, 28 include an upper section 30 and a lower section 32 supported in the upper section 30 for telescoping movement relative to the upper section 30. Cross braces 36 extend between the upper sections 30 of the first and second legs 26, 28 and are secured to the frame 18 to support the first and second legs 26, 28.

The drive mechanism 16 is supported under the trailer 14 and, in some embodiments, such as the illustrated embodiment of FIGS. 1-8, is at least partially supported on the cross braces 36 between the first and second legs 26, 28.

As shown in FIGS. 1-8, the drive mechanism 16 can include a gear box 40 having a first gear arrangement having a first gear ratio and a second gear arrangement having a second, different gear ratio. An output shaft 42 extends outwardly from the gearbox 40 and includes a first end engageable with the first leg 26 and a second end engageable with the second leg 28. The output shaft 42 is also selectively engageable with the first gear arrangement and the second gear arrangement. During operation, the gear box 40 is operable to rotate the output shaft 42 using the first gear arrangement and the second gear arrangement to raise and lower the first and second legs 26, 28.

An input shaft 44 extends through a lower end of the gear box 40 and includes a first end 46 and a second end 48. In some embodiments, such as the illustrated embodiment of FIGS. 1-8, the input shaft 44 is movable along an axis 50 to selectively engage the first gear arrangement and the second gear arrangement. The first end 46 of the input shaft 44 extends inwardly toward a motor 54 (shown schematically in FIG. 9).

Figure 2:
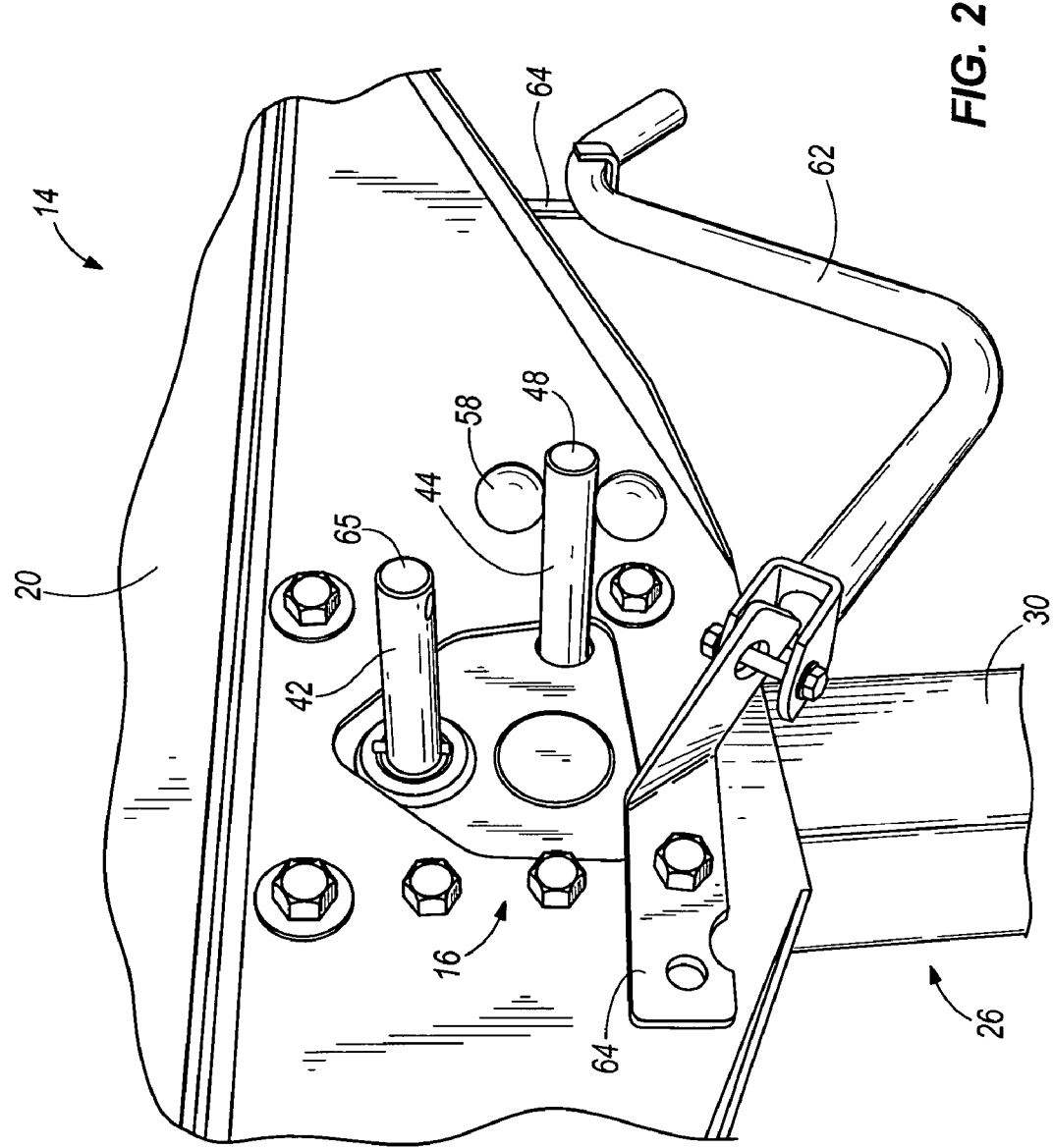
FIG. 2 is a side view of a portion of the trailer support and a portion of the drive mechanism shown in FIG. 1.

As illustrated in FIG. 2, the second end 48 of the input shaft 44 extends outwardly through an exterior side of the gear box 40 and includes an actuator handle 58. During operation and as explained below, an operator can grip the actuator handle 58 to move the input shaft 44 along the axis 50 to alternately engage the input shaft 44 with the first gear arrangement of the gear box 40 and the second gear arrangement of the gear box 40.

In some embodiments, such as the illustrated embodiment of FIGS. 1-8, the drive mechanism 16 can also include a hand crank 62 for manually rotating the output shaft 42. In these embodiments, the hand crank 62 can be supported on brackets 64 adjacent to the drive mechanism 16. The hand crank 62 is engageable with an outer end of the output shaft 42 so that an operator can rotate the hand crank 62 and the output shaft 42 relative to the gear box 40 to raise and lower the lower sections 32 of the first and second legs 26, 28.

In other embodiments, the hand crank 62 is also or alternately engageable with the second end 48 of the input shaft 44 so that an operator can rotate the hand crank 62 and the input shaft 44 relative to the gear box 40. In these embodiments, the operator can also move the input shaft 44 axially along the axis 50 to selectively engage the first gear arrangement and the second gear arrangement for raising and lowering the lower sections 32 of the first and second legs 26, 28.

In the illustrated embodiment of FIGS. 1-8, the drive mechanism 16 includes support brackets 66 secured to the cross braces 36 between the first and second legs 26, 28. In this embodiment, the motor 54 can be supported between the brackets 66 and can be at least partially aligned with the input shaft 44 of the gear box 40. In some embodiments, the brackets 66 can include adjustable fasteners 68 for securing the motor 54 and the brackets 66 to the cross braces 36 and for facilitating adjustment of the support brackets 66 and the motor relative to the cross braces 36 and/or the frame 18 of the trailer 14. As shown in FIGS. 1-8, the fasteners 68 can include pipe clamps. In other embodiments, the support brackets 66 can be secured to the cross braces 38 or the frame 18 in any suitable manner, such as by welds, brazing, bolts, screws, pins, nails, rivets, or other conventional fasteners, by clasps, or other fastening devices, by inter-engaging elements, and the like.

In some embodiments, such as the illustrated embodiment of FIGS. 1-8, a sleeve 70 is connected to the support brackets 66 and at least partially surrounds the motor 54. In these embodiments, the sleeve 70 houses the motor 54 and protects the motor 54 from debris, water, road salt, etc.

In the illustrated embodiment of FIGS. 1-8, the motor 54 is an air-vane motor. In other embodiments, other motors, including electric motors, hydraulic motors, etc., could also or alternately be used. A motor shaft 74 extends outwardly from the motor 54 through a support bracket 66. In some embodiments, such as the illustrated embodiment of FIGS. 1-8, the motor shaft 74 has a substantially square cross-sectional shape. In other embodiments, the motor shaft 74 can have any other cross-sectional shape, including without limitation round, oval, polygonal, irregular, and other cross-sectional shapes.

A collar assembly 78 is positioned between the input shaft 44 and the motor shaft 74 and is operable to drivingly connect the motor shaft 74 to the input shaft 44. As explained in greater detail below, the collar assembly 78 can have a ball-and-socket configuration and can permit axial translation of the input shaft 44 with respect to the motor shaft 74 along the axis 50 so that the input shaft 44 can be shifted between engagement with the first gear arrangement and the second gear arrangement of the gear box 40.

In some embodiments, the collar assembly 78 also accommodates angular misalignment of the motor shaft 74 and the input shaft 44. More particularly, in such embodiments, the collar assembly 78 drivingly connects the motor shaft 74 and the input shaft 44, when the motor shaft 74 and the input shaft 44 are collinear and when the motor shaft 74 and the input shaft 44 are not collinear. The ability to drivingly connect the motor shaft 74 and the input shaft 44 and the ability to facilitate such a driving connection while accommodating angular misalignment of the motor shaft 74 and the input shaft 44 is particularly useful in embodiments in which the drive mechanism 16 is connected to trailers 14 having different designs and frame structures manufactured by different manufacturers. This ability is also useful when installing the drive mechanism 16 on trailers 14 and trailer frames 18 that have become bent, twisted, or otherwise worn.

As best illustrated in FIGS. 10-18, the collar assembly 78 includes an outer coupler 80, a shaft adapter 82, an inner coupler 84, and a number of bearings 86 supported between the outer and inner couplers 80, 84 for drivingly connecting the outer and inner couplers 80, 84. The outer coupler 80 includes a substantially cylindrical sleeve 90 and a number of grooves 92 formed along an inner surface 94 of the sleeve 90.

Figure 10:
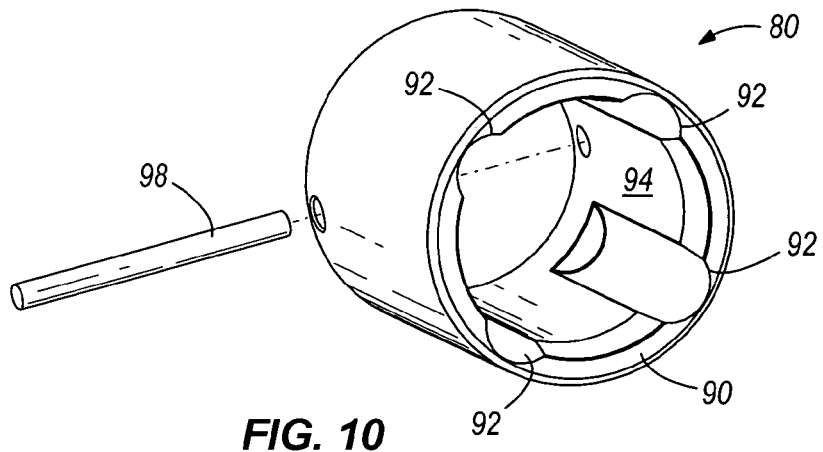
FIG. 10 is a perspective view of a first coupler of the drive mechanism shown in FIG. 1.

In the illustrated embodiment of FIGS. 10-18, the shaft adapter 82 is secured in an opening 93 at one end of the outer coupler 80 and includes a square-shaped aperture 94 engageable with the motor shaft 74. As shown in FIG. 10, a pin 98 secures the shaft adapter 82 to the outer coupler 80. Alternatively or in addition, the shaft adapter 82 can be secured to the outer coupler 80 in any suitable manner, such as by welds, brazing, bolts, screws, pins, nails, rivets, or other conventional fasteners, by clasps, or other fastening devices, by inter-engaging elements, and the like.

In other embodiments, the shaft adapter 82 can be integrally formed with the outer coupler 80 and can have an aperture 94 having any cross-sectional shape, including without limitation oval, polygonal, irregular, triangular, rectangular, and other cross-sectional shapes. In still other embodiments, the shaft adapter 82 and/or the outer coupler 80 can be integrally formed with the motor shaft 74. In yet other embodiments, the shaft adapter 82 and/or the outer coupler 80 can be replaced with other shaft adapters 82 and/or outer couplers 80 including an aperture 94 having a different cross-sectional shape to accommodate different motor shafts 74 having different cross-sectional shapes.

Figure 3:
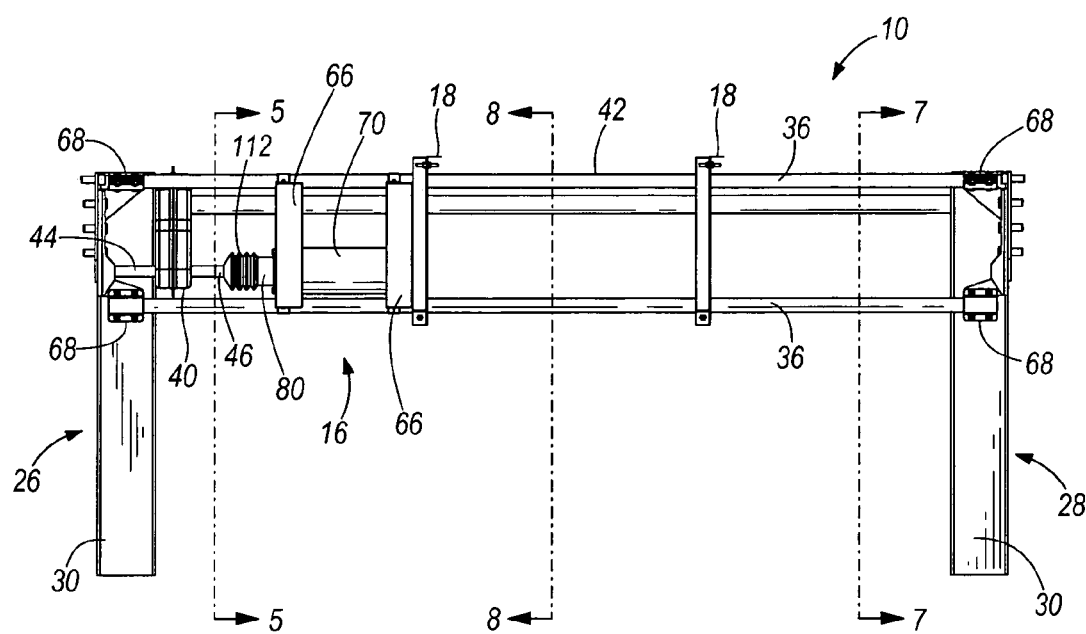
FIG. 3 is a front view of the trailer support and the drive mechanism shown in FIG. 1.
Figure 4:
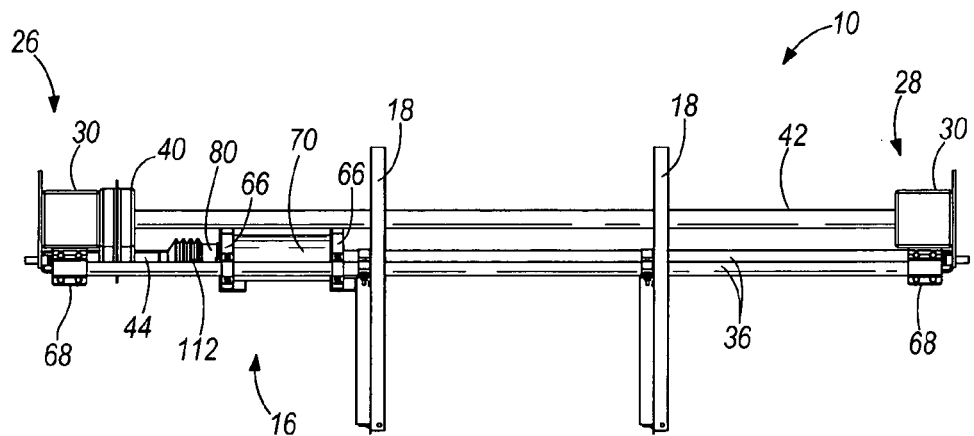
FIG. 4 is a top view of the trailer support and the drive mechanism shown in FIG. 1.
Figure 6:
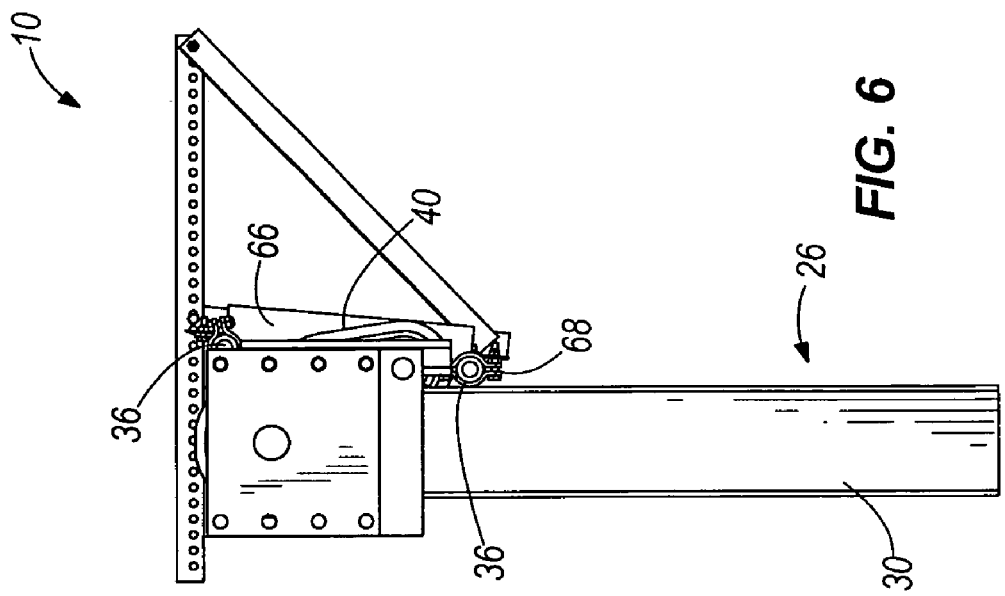
FIG. 6 is a side view of the trailer support and the drive mechanism shown in FIG. 1.
Figure 5:
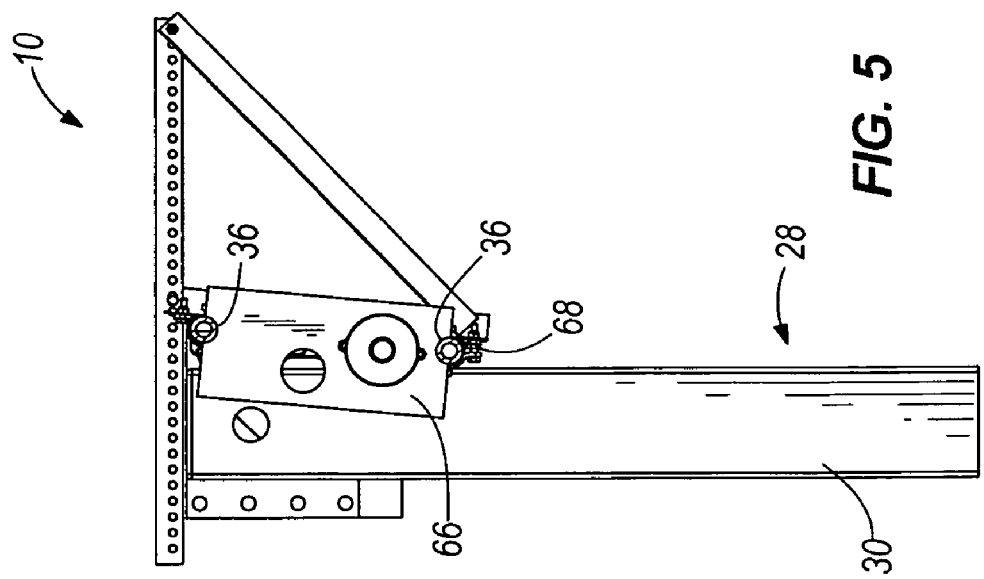
FIG. 5 is a cross-sectional view of the trailer support and the drive mechanism taken along line 5-5.
Figure 8:
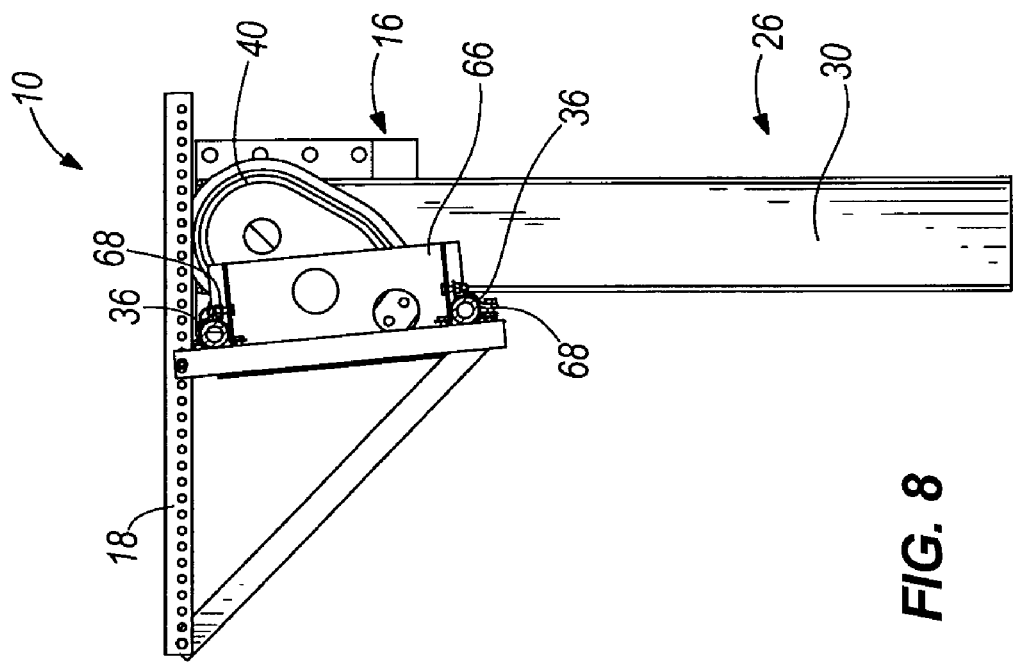
FIG. 8 is a cross-sectional view of the trailer support and the drive mechanism taken along line 8-8.
Figure 7:
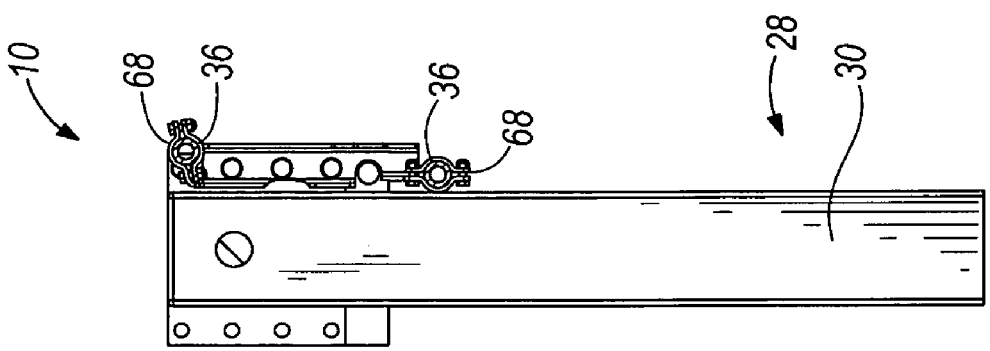
FIG. 7 is a cross-sectional view of the trailer support and the drive mechanism taken along line 7-7.
Figure 15:
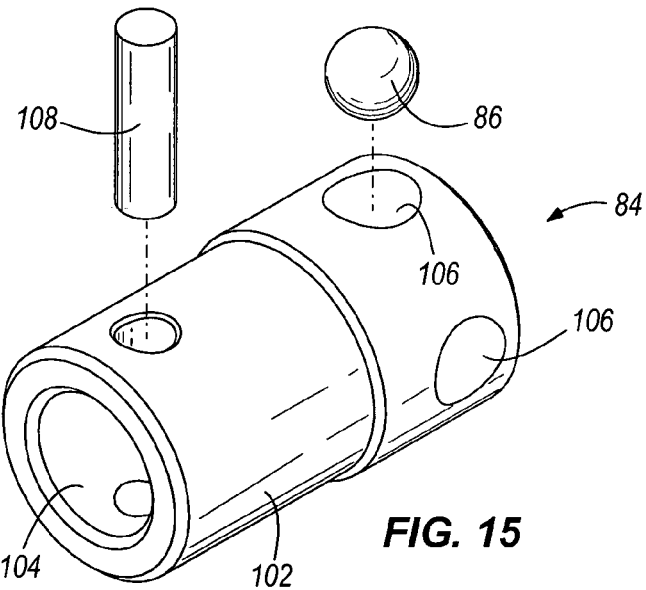
FIG. 15 is a perspective view of a second coupler of the drive mechanism shown in FIG. 1.
Figure 16:
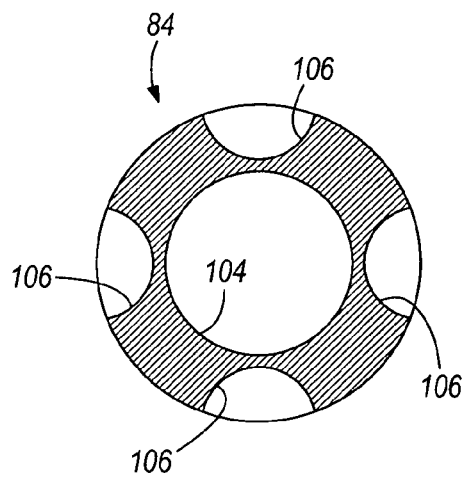
FIG. 16 is a cross-sectional view of the second coupler taken along line 16-16.
Figure 17:
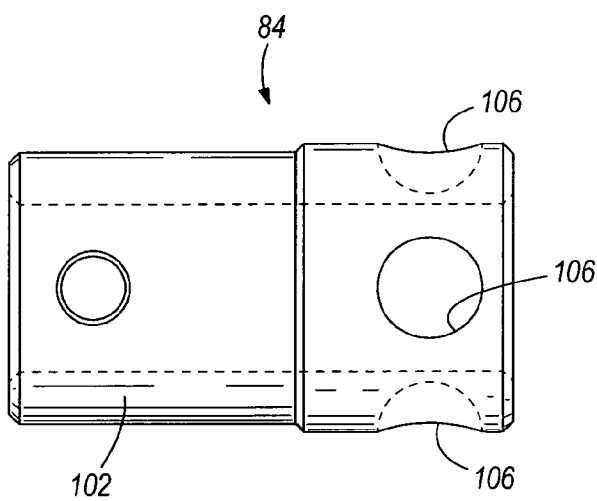
FIG. 17 is a top view of the second coupler shown in FIG. 15.
Figure 18:
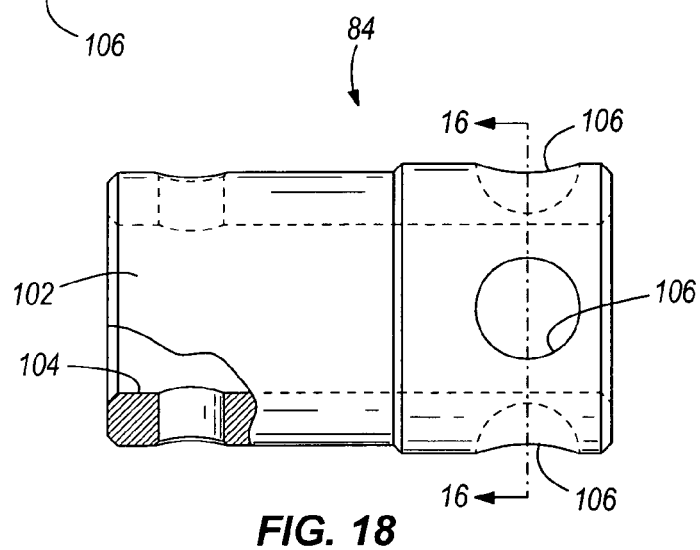
FIG. 18 is a side view of the second coupler shown in FIG. 15.
Figure 19:
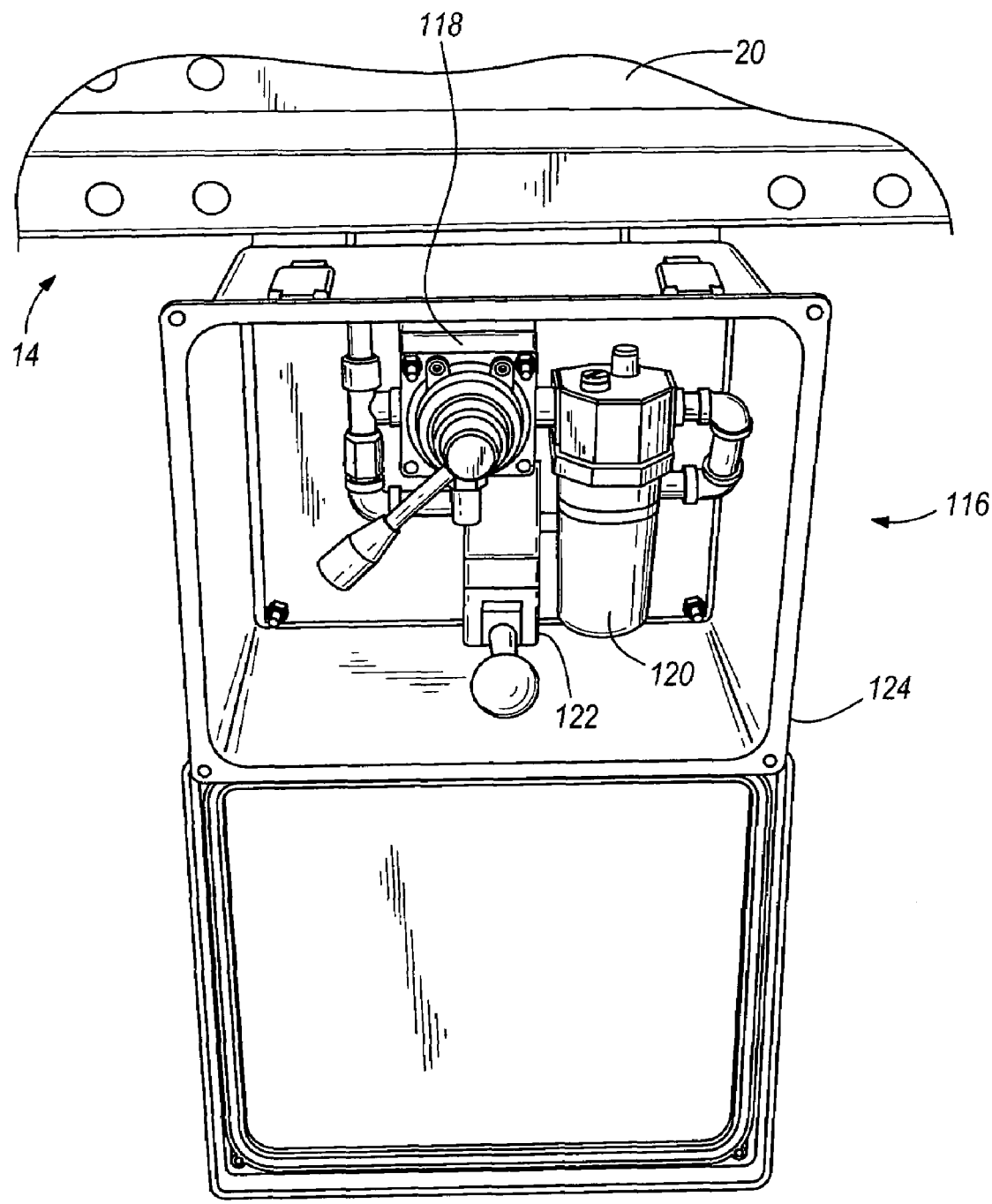
FIG. 19 is a side view of a control arrangement for the drive mechanism shown in FIG. 1.

As shown in FIGS. 15-18, the inner coupler 84 includes a substantially cylindrical sleeve 102, an aperture 104 extending axially through the sleeve 102, and openings 106 spaced radially around the outer surface of the sleeve 102. As shown in FIGS. 1, 3, and 4, the first end 46 of the input shaft 44 extends through the aperture 104 in the sleeve 102 and is secured to the sleeve 102 for rotating motion with the input shaft 44. As shown in FIG. 15, a pin 108 secures the input shaft 44 to the inner coupler 84. Alternatively or in addition, the inner coupler 84 can be secured to the input shaft 44 in any suitable manner, such as by welds, brazing, bolts, screws, nails, rivets, or other conventional fasteners, by clasps, clamps or other fastening devices, by inter-engaging elements, and the like. In still other embodiments, the inner coupler 84 can be integrally formed with the input shaft 44.

Figure 11:
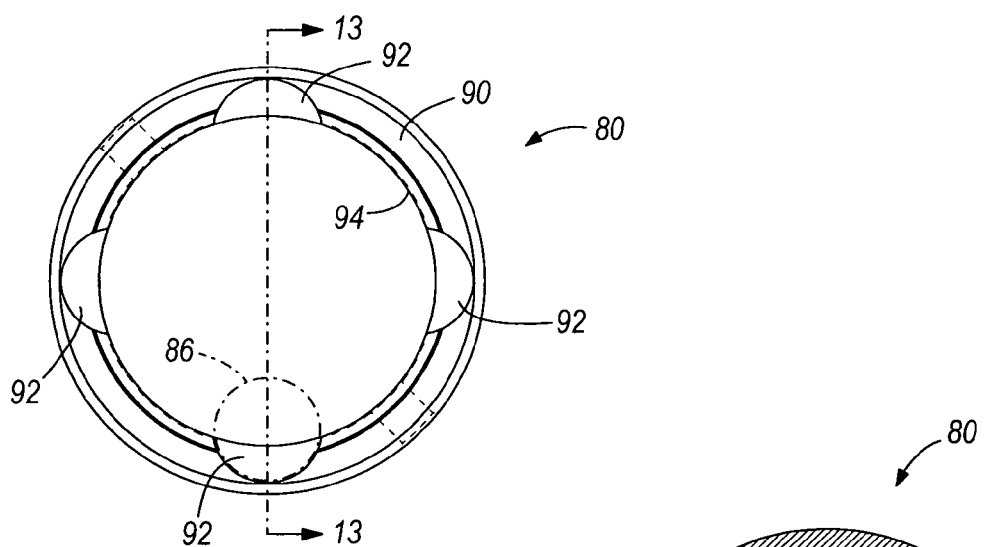
FIG. 11 is a front view of the first coupler shown in FIG. 10.
Figure 12:
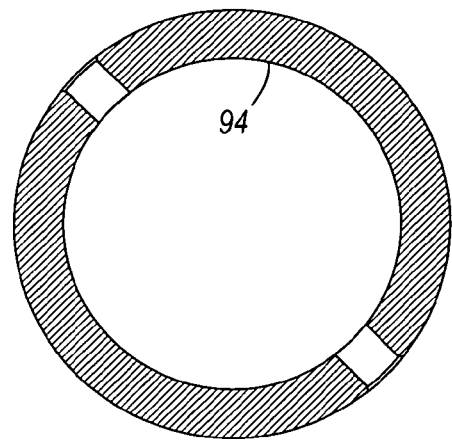
FIG. 12 is a cross-sectional view of the first coupler taken along line 12-12.
Figure 13:
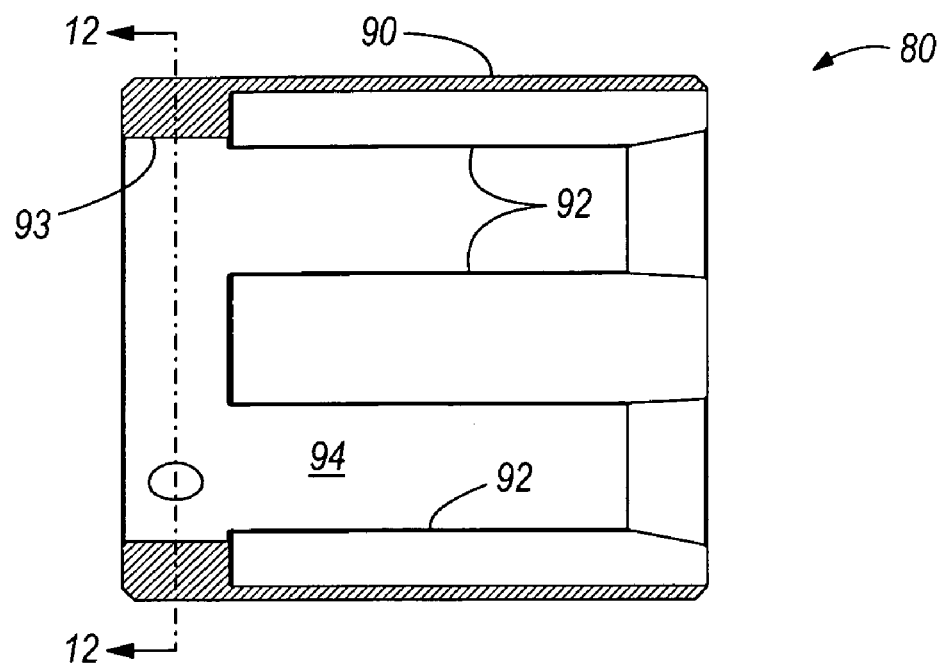
FIG. 13 is a cross-sectional view of the first coupler taken along line 13-13.
Figure 14:
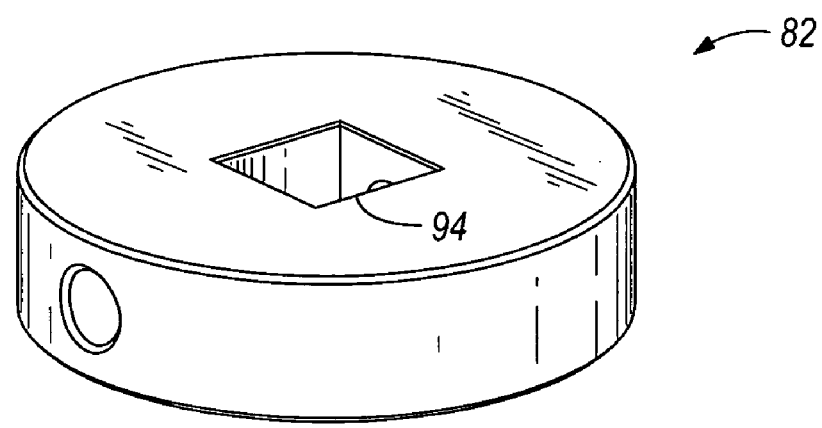
FIG. 14 is a perspective view of a shaft adapter of the first coupler shown in FIG. 10.

In the illustrated embodiment of FIGS. 1-19, the inner coupler 84 is supported in the sleeve 90 of the outer coupler 80 and the bearings 86 are supported between the outer surface of the inner coupler 84 and the inner surface of the outer coupler 90. As shown in FIGS. 11 and 15, the bearings 86 are supported in the openings 106 in the outer surface of the inner coupler 84 and engage the grooves 92 of the outer coupler 80. In the illustrated embodiment of FIGS. 1-19, the bearings 86 are generally spherically shaped. In some embodiments, the bearings 86 can have other shapes.

The bearings 86 drivingly connect the inner and outer couplers 84, 80 and facilitate relative movement of the inner and outer couplers 84, 80, and consequently the input shaft 44, which is connected to the inner coupler 84, and the motor shaft 74, which is connected to the outer coupler 84. The bearings 86 also allow the inner and outer couplers 84, 80 to be drivingly connected while the inner and outer couplers 84, 80 are angularly misaligned about the axis 50.

During movement of the input shaft 44 along the axis 50, the bearings 86 move axially along the grooves 92 in the outer coupler 80 to maintain the driving connection between the inner and outer couplers 84, 80. In some embodiments, the grooves 92 are sized to accommodate circumferential movement of the bearings 86 about the inner surface of the sleeve 90. In these embodiments, the bearings 86 move circumferentially a short distance around the inner surface of the sleeve 90 and remain in the grooves 92 to accommodate misalignment of the input shaft 44 and the motor shaft 74, and consequently the outer coupler 80 and the inner coupler 84, in a direction substantially perpendicular to the axis 50.

In some embodiments, the collar assembly 78 can be at least partially filled with a lubricant to reduce friction between the inner coupler 84, the outer coupler 80, and the bearings 86. The collar assembly 78 can also include a boot 112, which at least partially surrounds the inner and outer couplers 84, 80 to reduce lubricant loss and prevent debris from entering the collar assembly 78. In some embodiments, the boot 112 is formed of a flexible material so as not to inhibit relative movement between the inner and outer couplers 84, 80.

In the illustrated embodiment, the drive mechanism 16 also includes an air distribution system 116 for supplying air to the motor 54. The air distribution system 116 includes a first control valve 118, an air lubricator 120, and a second control valve 122. In some embodiments, such as the illustrated embodiment of FIGS. 1-19, the first control valve 118, the air lubricator 120, and the second control valve 122 are supported in a controller housing 124 under the trailer 14 adjacent to the first leg 26. In other embodiments, the controller housing 124 can be supported in other locations around the trailer 14.

In the illustrated embodiment, the air distribution system 116 can receive compressed air from existing air brake air lines 128 on the trailer 14. In other embodiments, the air distribution system 116 receives compressed air from a dedicated supply.

Figure 9:
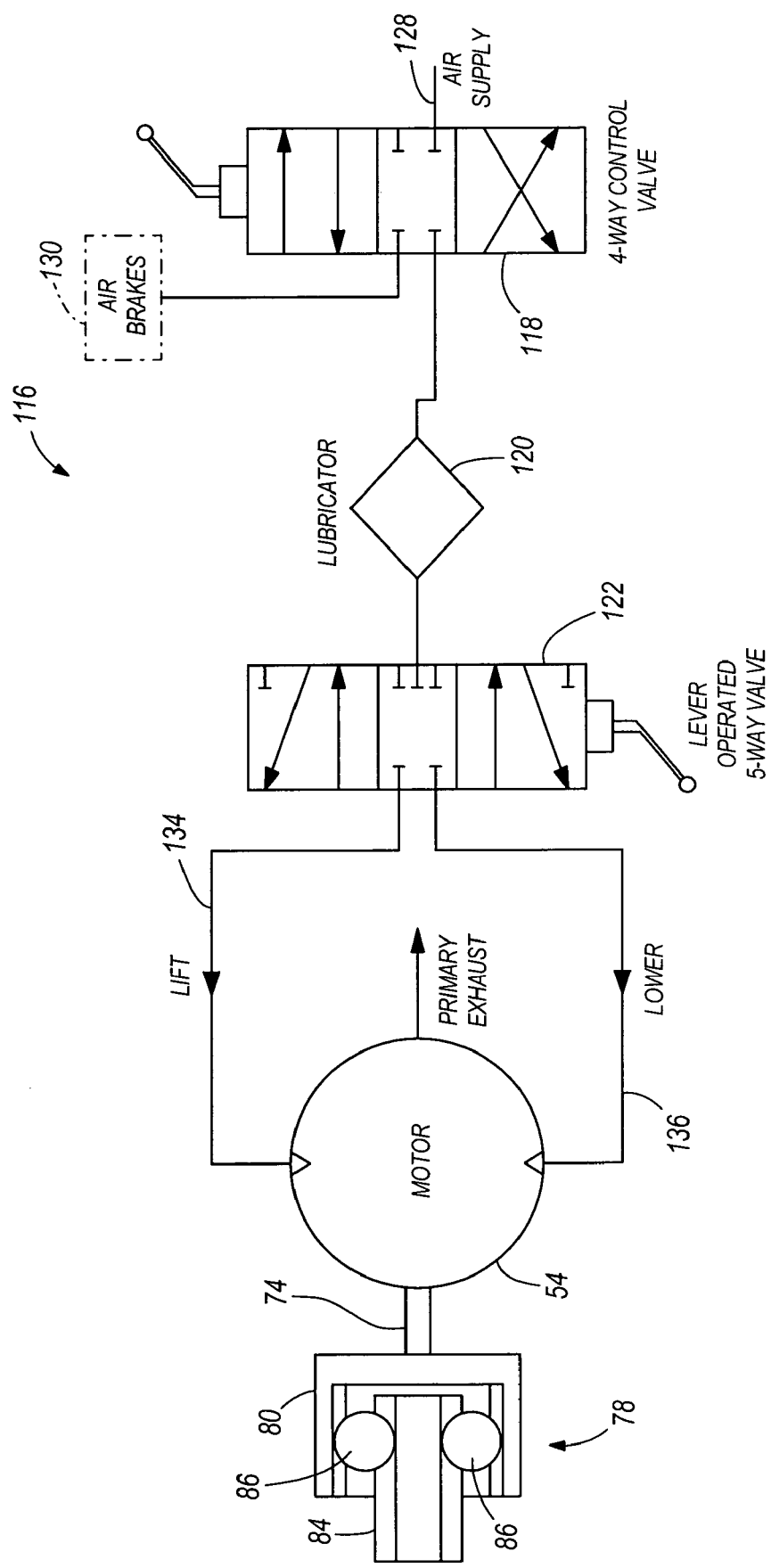
FIG. 9 is a partial schematic illustrating the drive mechanism according to some embodiments of the present invention.

As shown in FIG. 9, compressed air is directed to the first control valve 118. The first control valve 118 can be a four-way valve having two positions. In a first position, the first control valve 118 fluidly connects the air supply to the air brakes 130, maintaining the air brakes 130 in an unlocked condition. In a second position, the first control valve 118 directs compressed air toward the lubricator 120. When the first control valve 118 is moved toward the second position, the air supply to the air brakes 130 is interrupted, causing the air brakes 130 to move toward a braked or locked condition. In this manner and as explained in greater detail below, the drive mechanism 16 is prevented from moving the trailer support arrangement 10 with respect to the trailer 14 unless the trailer air brakes 130 are in a braked or locked condition.

In embodiments, such as the illustrated embodiment of FIGS. 1-19 having a lubricator 120, the lubricator 120 adds lubricant to the compressed air before the compressed air enters the motor 54. In these embodiments, the lubricant reduces friction and wear in the motor 54.

From the lubricator 120, the compressed air travels to the second control valve 122. In the illustrated embodiment, the second valve 122 is a five way valve and is moveable between a first or neutral position, in which air is prevented from entering the air motor 54 and is vented from the second valve 122 into the atmosphere, a second position 133, in which the compressed air is directed along a first flow path 134, and a third position 135, in which the compressed air is directed along a second flow path 136.

When the second valve 122 is moved toward the second position 133, compressed air flows through the first flow path 134 rotating the air motor 54 in a first direction and causing the trailer support arrangement 10 to move relative to the trailer 14 (e.g., moving the lower sections 32 of the first and second legs 26, 28 downwardly to lift the trailer 14 upwardly). At least some of the compressed air is vented directly from the air motor 54. The remaining compressed air is vented through the second flow path 136 back toward the second valve 122 where the remaining compressed air is vented to the atmosphere.

When the second valve 122 is moved toward the third position 135, compressed air flows through the second flow path 136 rotating the air motor 54 in a second direction and causing the trailer support arrangement 10 to move relative to the trailer 14 (e.g., moving the lower sections 32 of the first and second legs 26, 28 upwardly to lower the trailer 14 downwardly). At least some of the compressed air is vented directly from the air motor 54. The remaining compressed air is vented through the first flow path 134 back toward the second valve 122 where the remaining compressed air is vented to the atmosphere.

As mentioned above, the drive mechanism 16 of the present invention can be factory installed on a trailer 14, or alternately, the drive mechanism 16 can be added to trailers 14 as an after-market attachment. In these embodiments, the support brackets 66 (see FIGS. 1-8) are secured to the frame 14, or alternately, to cross braces 36. The motor 54 and the sleeve 70 are supported between the brackets 66. The collar assembly 78 is then secured to the input shaft 44 and the motor shaft 74 to drivingly connect the motor shaft 74 and the input shaft 44.

As mentioned above, the collar assembly 78 drivingly connects the motor shaft 74 and the input shaft 44 when the input shaft 44 and the motor shaft 74 are axially aligned and when the input shaft 44 and the motor shaft 74 are axially misaligned. To accommodate misalignment of the motor shaft 74 and the input shaft 74, the bearings 86 are movable along the grooves 92 relative to the outer coupler 80 and the inner coupler 84.

In operation, an operator parks the trailer 14 and opens the controller housing 124. The operator then grasps the actuator handle 58 and moves the input shaft 44 along the axis 50 to alternately engage the input shaft 44 and the first gear arrangement of the gear box 40 or the second gear arrangement of the gear box 40. The operator then moves the first valve 118 from the first position to the second position, securing the air brakes 130 in the locked position and directing compressed air toward the lubricator 120 and the second valve 122.

The second valve 122 is biased into a first position in which it permits no compressed air to flow to the motor 54. The operator can move the second valve 122 from the first position toward either a second position or a third position to direct the compressed air along either a first flow path 134 or a second flow path 136 to move the trailer support arrangement 10 relative to the trailer 14 (i.e., to move the lower sections 32 of the first and second legs 26, 28 upwardly or downwardly with respect to the trailer 14). After the trailer support arrangement 10 is moved to a desired orientation, the operator permits the second valve 122 to move to the first position to interrupt air flow to the motor 54 and moves the first valve 118 toward the first position to supply air to the air brakes 130.

The embodiments described above and illustrated in the figures are presented by way of example only and are not intended as a limitation upon the concepts and principles of the present invention. For example, while reference is made herein to an embodiment in which the inner coupler 84 is secured to the motor shaft 74 and the outer coupler 80 is secured to the input shaft 44, in other embodiments, the inner coupler 84 can alternately be secured to the input shaft 44 and the outer coupler 80 can be secured to the input shaft 44.

The invention claimed is:

1. A trailer lift assembly comprising:
a frame;
first and second legs each including an upper part connected to the frame and a lower part movable with respect to the upper part to shorten and lengthen the legs;
a motor rigidly mounted to the frame and including a rotatable motor shaft;
a gearbox rigidly mounted to the frame and having first and second gear arrangements, a rotatable input shaft having a longitudinal axis and being supported for translational axial movement between a first position in which the input shaft engages and rotates the first gear arrangement and a second position in which the input shaft engages and rotates the second gear arrangement, and a rotatable output shaft rotating at first and second different speed ratios with respect to the speed of rotation of the input shaft in response to the input shaft rotating the respective first and second gear arrangements; and
a coupling mechanism including inner and outer couplers coupled for rotation together, the inner coupler being received within the outer coupler to permit telescopic movement of the inner and outer couplers with respect to each other, one of the inner and outer couplers being mounted for rotation with the motor shaft and the other being mounted for rotation with the input shaft, one of the inner and outer couplers including at least one slot and the other of the inner and outer couplers including at least one bearing received in and slidable along the at least one slot to accommodate movement of the input shaft between the first and second positions and to transfer torque from the motor shaft to the input shaft to cause rotation of the input shaft in response to rotation of the motor shaft;
wherein the output shaft is operably interconnected with both the first and second legs to cause the lower parts of the legs to move with respect to the upper parts at a first rate in response to the input shaft rotating the first gear arrangement, and at a second rate in response to the input shaft rotating the second gear arrangement.

2. The assembly of claim 1, wherein the motor operates under the influence of compressed air.

3. The assembly of claim 1, wherein the motor shaft defines a longitudinal axis, and wherein the at least one bearing of the coupling mechanism includes a curved surface to accommodate the longitudinal axes of the input shaft and motor shaft being non-collinear while transferring rotation of the motor shaft to the input shaft.

4. A mechanism for coupling first and second shafts, the mechanism comprising:
an outer coupler including an inner surface defining a bore, the outer coupler being adapted to mount to a first shaft for rotation with the first shaft;
an inner coupler including an outer surface, the inner coupler being adapted to mount to a second shaft for rotation with the second shaft, the inner coupler being received within the bore of the outer coupler;
at least one slot defined in one of the inner surface of the outer coupler and the outer surface of the inner coupler;
at least one opening in the other of the inner surface of the outer coupler and the outer surface of the inner coupler and facing the at least one slot; and
at least one bearing received in the at least one opening and engaging the at least one slot to transfer torque from the first shaft to the second shaft, to accommodate relative axial movement of the first and second shafts shaft, and to accommodate relative off-axis pivoting of the first and second shafts.

* * * * *